(12) United States Patent
Fuse et al.

(10) Patent No.: US 6,855,019 B2
(45) Date of Patent: Feb. 15, 2005

(54) JET PROPULSION WATERCRAFT

(75) Inventors: Tomohiro Fuse, Saitama (JP); Takao Kochi, Saitama (JP); Jo Yoshida, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/219,499

(22) Filed: Aug. 16, 2002

(65) Prior Publication Data

US 2003/0064637 A1 Apr. 3, 2003

(30) Foreign Application Priority Data

Sep. 18, 2001 (JP) ........................................ 2001-284096

(51) Int. Cl.[7] .............................................. B63H 35/62
(52) U.S. Cl. ...................................... 440/47; 114/55.51
(58) Field of Search ............................. 440/38, 46, 47; 114/55.5, 55.51, 55.53

(56) References Cited

U.S. PATENT DOCUMENTS

| | | | | |
|---|---|---|---|---|
| 5,176,547 A | * | 1/1993 | Kobayashi et al. | 440/38 |
| 5,433,635 A | * | 7/1995 | Kobayashi | 440/2 |
| 5,690,520 A | * | 11/1997 | Rheault | 440/46 |
| 5,700,169 A | * | 12/1997 | Jones | 440/46 |
| D392,936 S | * | 3/1998 | Koyanagi | D12/317 |
| 6,066,014 A | * | 5/2000 | Smith et al. | 440/89 R |
| 6,101,965 A | * | 8/2000 | Koyanagi | 114/288 |
| 6,224,435 B1 | * | 5/2001 | Freitag et al. | 440/38 |
| 6,244,913 B1 | * | 6/2001 | Matsumoto et al. | 440/38 |
| 6,431,925 B1 | * | 8/2002 | Ito et al. | 440/38 |

FOREIGN PATENT DOCUMENTS

| | | | | |
|---|---|---|---|---|
| EP | 472832 A2 | * | 3/1992 | B63H/11/02 |
| JP | 6-312684 A | | 11/1994 | |

* cited by examiner

*Primary Examiner*—Andrew D. Wright
(74) *Attorney, Agent, or Firm*—Birch, Stewart, Kolasch & Birch, LLP

(57) ABSTRACT

To provide a jet propulsion watercraft that allows a step, a vent hole, and the like to be easily provided on a bottom surface thereof. A ride plate of a jet propulsion watercraft is a member, which is formed into a substantially rectangular shape in compliance to an opening in a bottom surface of a hull bottom. The ride plate is provided with a lock tab at a front edge thereof, and bolt holes are made in a right and left end portion thereof. The ride plate is further provided with a step portion that forms part of a general bottom surface, since it is flush with the general bottom surface, a higher level surface that forms a flat surface higher than the step portion by a predetermined distance, and a pair of vent holes that pass vertically through the higher level surface at a position therein closer to the step portion.

31 Claims, 8 Drawing Sheets

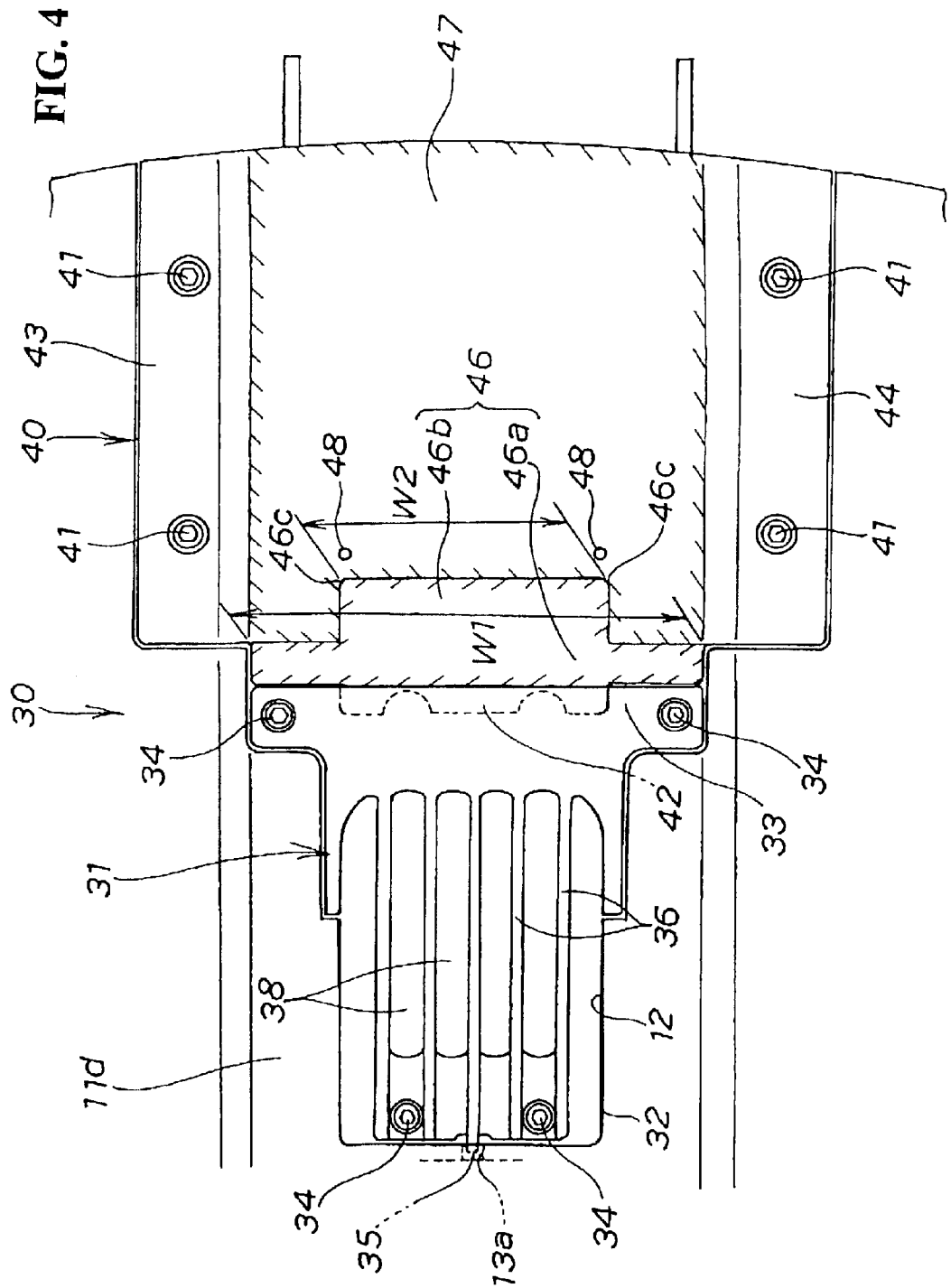

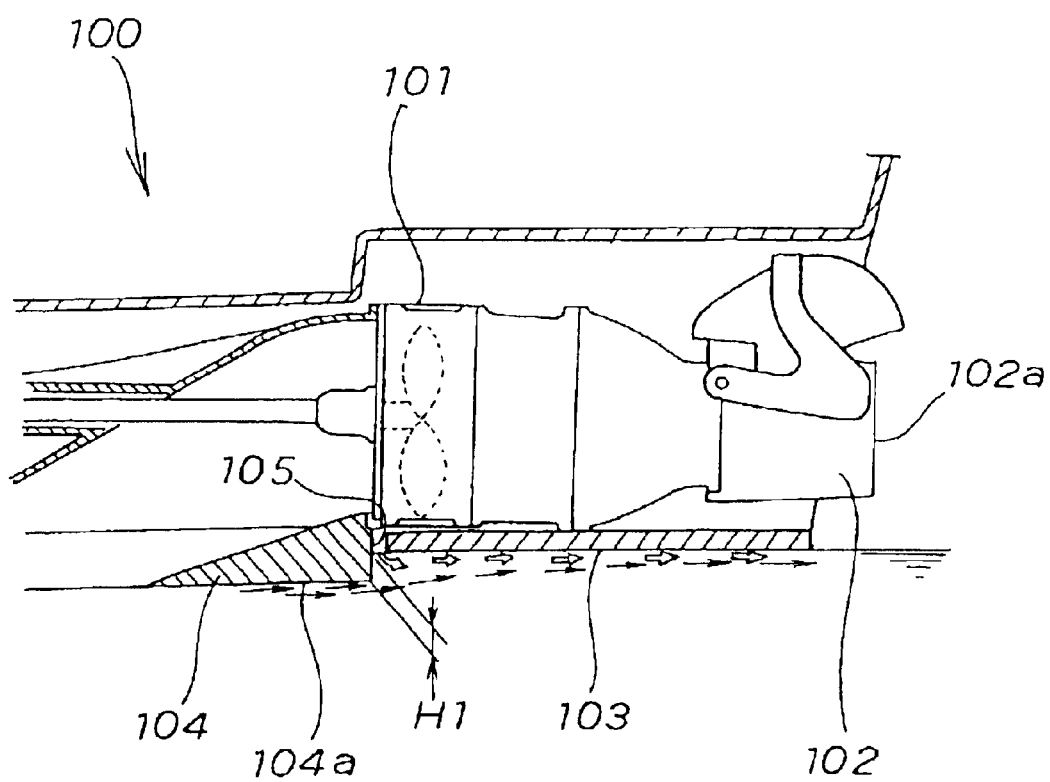

JET PROPULSION WATERCRAFT

CROSS-REFERENCE TO RELATED APPLICATIONS

This non-provisional application claims priority under 35 U.S.C. § 119(a) on Patent Application No. 2001-284096 filed in Japan on Sep. 18, 2001, the entirety of which is hereby incorporated by reference.

BACKGROUND OF THE INVENTION

1. Field of the Invention

The present invention relates to a jet propeller provided with a step portion on a bottom surface of a stem of a watercraft in order to reduce, during planing of the watercraft, a wet surface area of the watercraft and a resistance applied to a hull of the watercraft.

2. Description of Background Art

A jet propulsion watercraft has been known, for example, from Japanese Patent Laid-Open No. 6-312684 entitled "STERN PART STRUCTURE OF JET PROPULSION WATERCRAFT." The jet propulsion watercraft will be explained in detail with reference to FIG. 8 of the present invention. FIG. 8 of the present invention corresponds to FIGS. 5(a) and 5(b) of the above document. It should be noted that the reference numerals in FIG. 8 do not correspond to FIGS. 5(a) and 5(b) of the above document.

FIG. 8 is a cross-sectional view illustrating a jet propulsion watercraft according to the background art. A jet propulsion watercraft 100 is provided with a jet propeller 101 at a stem thereof. There is further provided a steering nozzle 102 at a rear of the jet propeller 101. When the jet propeller 101 is driven, a stream of water is expelled through an outlet port 102a of the steering nozzle 102, thus allowing the watercraft to plane on the water from the propulsion force of the expelled water.

A step H1 is formed on a bottom surface of the jet propulsion watercraft 100 by attaching a ride plate 103 to a level higher than a bottom surface 104a of a hull bottom 104 in order to reduce, during planing of the watercraft, a wet surface area of the watercraft 100 and a propulsion resistance applied to the hull of the watercraft 100. Forming the step H1 on the bottom surface makes a stream of water flow rearward from a side of the bottom surface 104a along the ride plate 103, thus reducing pressure at the rear of the step H1.

To prevent this decompression from occurring in the rear of the step H1, a clearance 105 is provided at the rear of the step H1, through which air inside the hull is supplied rearward the step H1. Forming the clearance 105 in the rear of the step H1 in this manner prevents the decompression in the rear of the step H1 from occurring. This accomplishes the function of reducing, during planing of the jet propulsion watercraft 100, the wet surface area of the watercraft 100 and the propulsion resistance applied to the watercraft 100.

In order to form the step H1 of a predetermined height in the bottom surface 104a of the hull bottom 104 and the clearance (namely a vent hole) 105 of a predetermined width in the rear of the step H1; however, it becomes necessary to enhance the accuracy of mounting the ride plate 103 to the hull bottom 104. This makes the mounting of the ride plate 103 to the hull bottom 104 labor-consuming, which hampers cost reduction.

SUMMARY OF THE INVENTION

It is therefore an object of the present invention to provide a jet propulsion watercraft that can be easily provided with a step and a vent hole in the bottom surface of the hull.

To achieve the foregoing object, according to a first aspect of the present invention, there is provided a jet propulsion watercraft, wherein a higher level surface is provided in a bottom surface of a stern thereof by way of a step portion extending in a width direction of the watercraft. The higher level surface is situated at a level higher by a predetermined dimension than the bottom surface. A vent hole passes vertically through the higher level surface at a position thereof closer to the step portion. Furthermore, the jet propulsion watercraft is propelled by a water jet expelled from a water jet propeller disposed in a stem thereof. In addition, a lower part of the jet propeller of the bottom surface of the stem is formed by a ride plate that is removable from a hull. The ride plate is provided with the step portion, the higher level surface, and the vent hole.

The step portion, the higher level surface, and the vent hole are formed in the ride plate together. Accordingly, it is possible to provide the stern bottom surface with a desired step portion, higher level surface, and vent hole even without stringently controlling the mounting accuracy of the ride plate to the hull more than necessary.

It is possible to easily provide a step portion, a higher level surface, and a vent hole required for allowing the jet propulsion watercraft to plane favorably in this manner without having to consume an extra amount of labor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a bottom plan view illustrating the jet propeller according to the present invention;

FIG. 8 is a cross-sectional view illustrating the conventional jet propulsion watercraft.

DETAILED DESCRIPTION OF THE PREFERRED EMBODIMENTS

Figure 1:
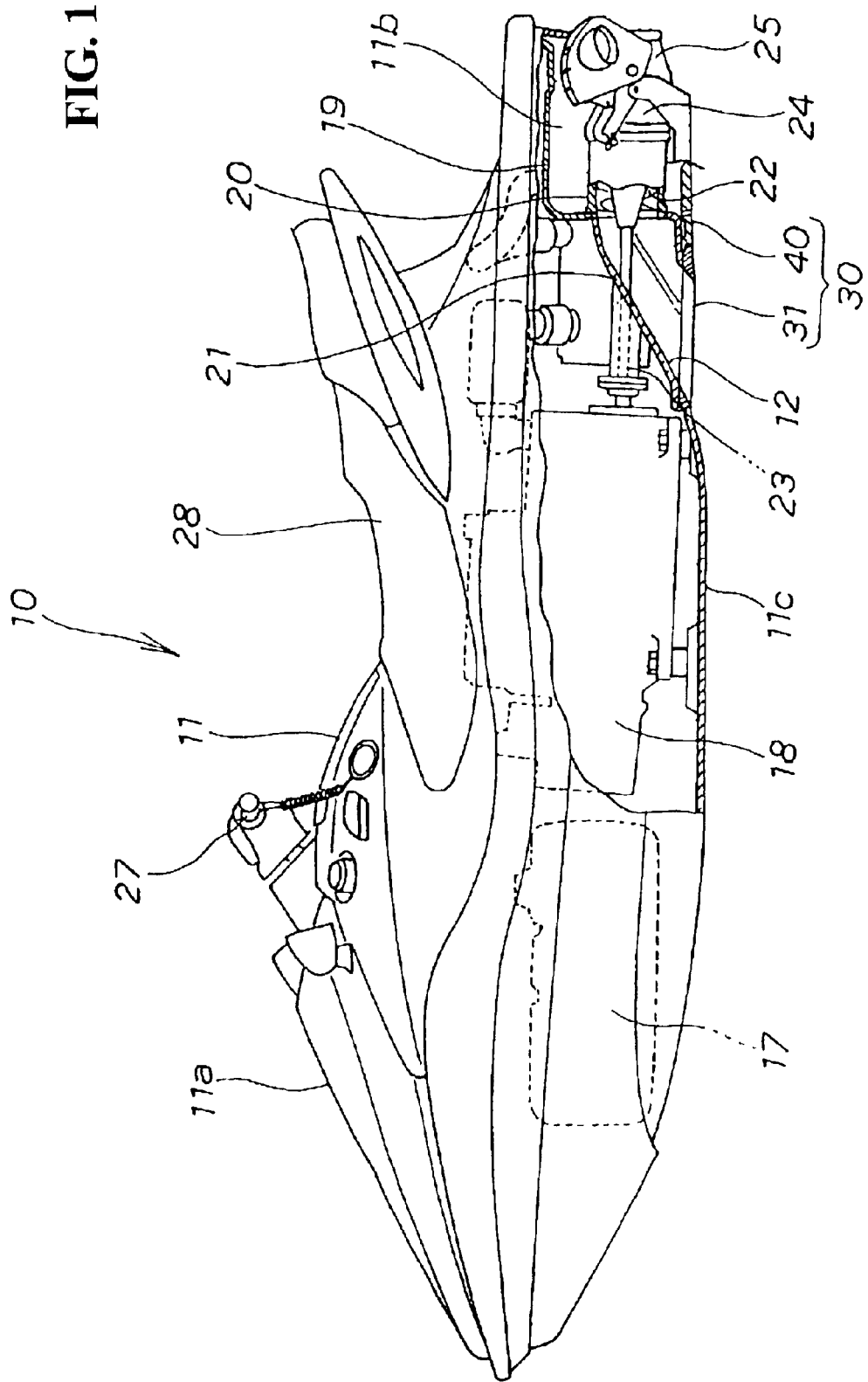
FIG. 1 is a side elevational view illustrating the jet propulsion watercraft according to the present invention.

The present invention will now be explained with reference to the accompanying drawings. The drawings should be viewed in the direction of orientation of the reference numerals.

FIG. 1 is a side elevational view illustrating the jet propulsion watercraft according to the present invention.

A jet propulsion watercraft 10 is provided with a fuel tank 17 mounted on a front portion 11a of a hull 11. An engine 18 is installed rearward of the fuel tank 17. A jet propeller chamber 19 is located rearward the engine 18. A jet propeller 20 is housed in the jet propeller chamber 19 and 8s located in a stern 11b of the hull 11. A steering nozzle 25 is mounted rearward of the jet propeller 20. The jet propulsion watercraft 10 is further provided with a handlebar 27 for operating the steering nozzle. The handlebar 27 is mounted above the fuel tank 17. A seat 28 is installed rearward of the handlebar 27. A hull bottom guard structure 30 is located on a hull bottom of the stern 11b.

Figure 2:
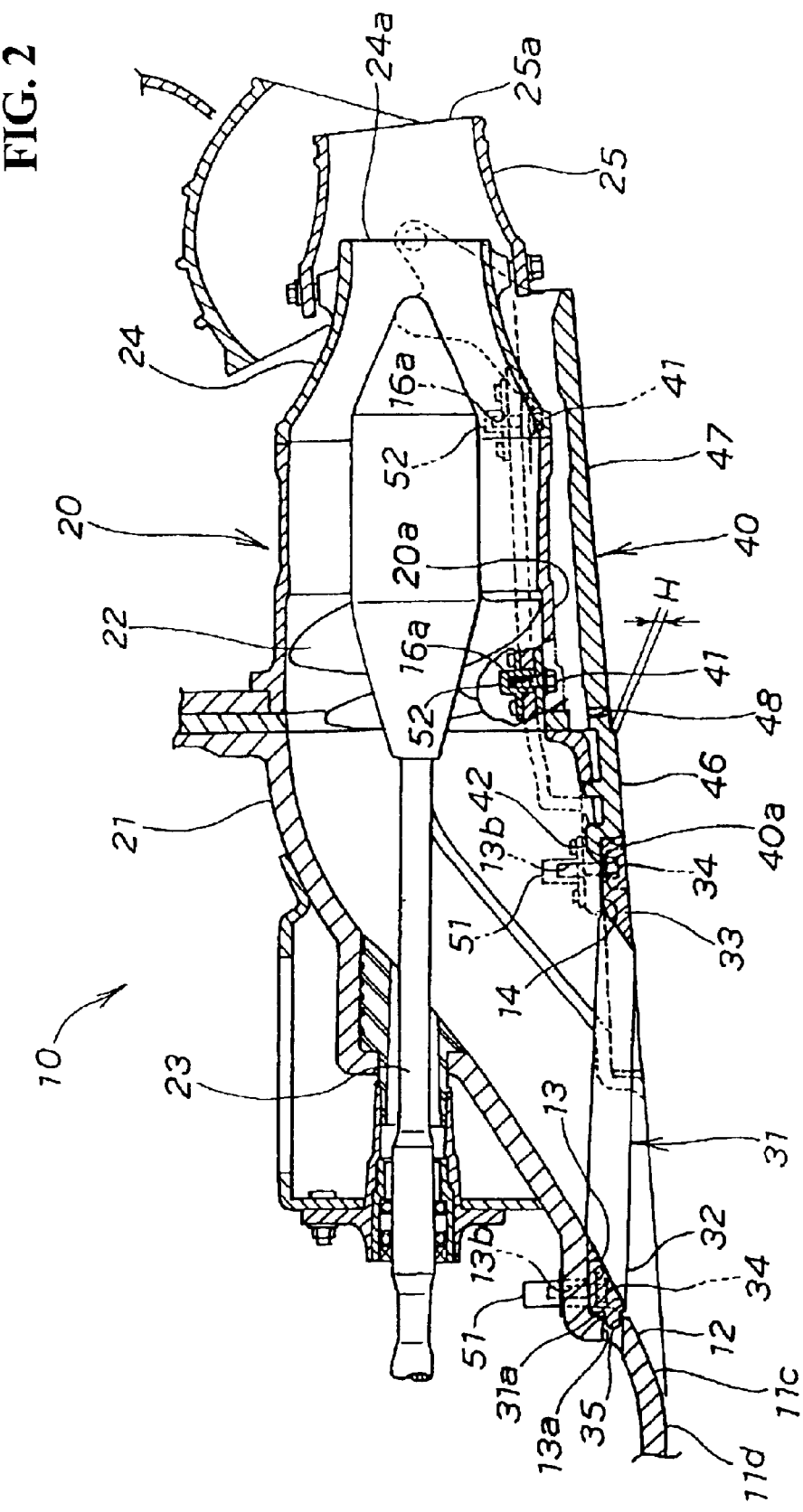
FIG. 2 is a cross-sectional view illustrating a principal part of the jet propulsion watercraft according to the present invention.

FIG. 2 is a cross-sectional view illustrating a principal part of the jet propulsion watercraft according to the present invention. The jet propeller 20 is provided with a housing 21 that extends rearward from an intake port 12 in a hull bottom 11c of the hull 11. An impeller 22 is rotatably mounted in the housing 21 and is coupled to a driving shaft 23 of the engine 18.

The hull bottom guard structure 30 includes a grid member 31 provided in the intake port 12 of the hull bottom 11c and a ride plate 40 provided rearward of the grid member 31.

The grid member 31 is a member, in which a front and a rear end portion 32, 33 are fitted in recessed portions 13, 14 provided at the front and rear of the intake port 12. The front and rear end portions 32, 33 are secured to the intake port 12 using bolts 34.

A protrusion 35 is provided at a front edge 31a of the grid member 31. The protrusion 35 is designed to be fitted into an engagement hole 13a in the front recessed portion 13. The grid member 31 can be easily mounted by simply inserting the protrusion 35 into the engagement hole 13a.

The ride plate 40 is secured to the rear of the grid member 31 with bolts 41. The ride plate 40 serves to plug an opening 15 (shown in FIG. 3) in the rear of the grid member 31. A lock tab 42 is provided at a front edge 40a of the ride plate 40. The lock tab 42 can be placed on a rear end portion 33 of the grid member 31. The ride plate 40 can be easily mounted by simply placing the lock tab 42 on the rear end portion 33 of the grid member 31.

According to the jet propulsion watercraft 10 arranged as explained in the foregoing description, it is possible to propel the watercraft as follows. Referring to FIG. 1, fuel is supplied from the fuel tank 17 to the engine 18 to drive the same. The driving force of the engine 18 is transmitted through the driving shaft 23 to the impeller 22 to turn the same. By turning the impeller 22, water is drawn in from the intake port 12 in the hull bottom 11c through the grid member 31. The water drawn in is fed through a rear end of the housing 21, i.e., an outlet 24a of a joint nozzle 24. Finally, the water is expelled through an outlet 25a of the steering nozzle 25 to provide the watercraft 10 with a propulsion force.

Figure 3:
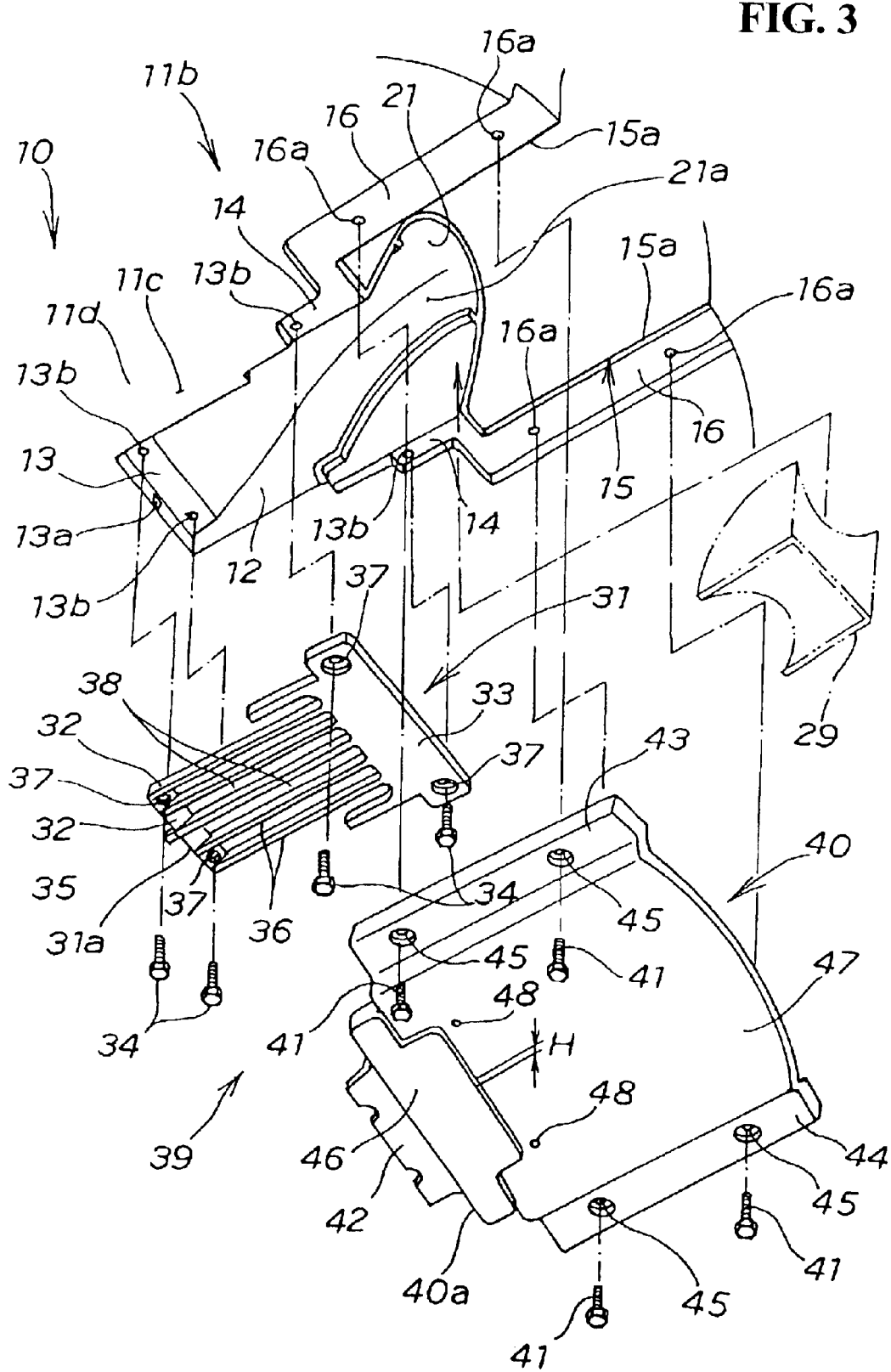
FIG. 3 is an exploded perspective view illustrating the principal part of the jet propulsion watercraft according to the present invention.

FIG. 3 is an exploded perspective view illustrating the principal part of the jet propulsion watercraft according to the present invention. FIG. 3 illustrates a condition, in which the intake port 12 of the jet propeller 20 (shown in FIG. 2) is formed in the hull bottom 11c of the stern 11b. The opening 15 is formed rearward of the intake port 12. The engagement hole 13a is formed at the front of the intake port 12. The front and the rear recessed portions 13, 14 are formed at the front and rear of the intake port 12. The front and the rear end portions 32, 33 of the grid member 31 are fitted in the front and rear recessed portions 13, 14. Threaded holes 13b are formed in the front and rear recessed portions 13, 14. The grid member 31 is mounted to the front and rear recessed portions 13, 14. Through the threaded holes 13b. The rear recessed portion 14 extends along peripheral edges 15a, 15a of the opening 15. Threaded holes 16a for mounting the ride plate 40 are formed in a right and a left recessed portion 16, 16 (hereinafter referred to as the "opening recessed portion") in the peripheral edges 15a, 15a.

The threaded holes 13b used for securing the grid member 31 are provided with metal bosses 51 on a backside of each of the front and the rear recessed portions 13, 14 as shown in FIG. 2. The threaded holes 13b are formed in the metal bosses 51.

The threaded holes 16a used for securing the ride plate 40 are provided with metal bosses 52 on a backside of the opening recessed portions 16, 16 as shown in FIG. 2. The threaded holes 16a are formed in the metal bosses 52.

The grid member 31 is formed as follows. Namely, a plurality of ridges 36 extending in a fore-and-aft direction along the hull bottom 11c are disposed at predetermined intervals. The front and the rear end portions 32, 33 are connected by the ridges 36, thereby forming a substantially rectangular shape corresponding to the intake port 12. In addition, the protrusion 35 is formed at the front edge 31a, and bolt holes 37 are formed on the right and left ends of the front and the rear end portions 32, 33.

The grid member 31 can be secured to the intake port 12 when the protrusion 35 thereof is inserted into the engagement hole 13a. The bolts 34 are inserted into the bolt holes 37 formed in the grid member 31. The inserted bolts 34 are screwed into the threaded holes 13b.

When the grid member 31 is secured to the intake port 12, an inside 21a of the housing 21 can be brought into communication with a hull outside 39 through grid clearances 38. This allows water from the hull outside 39 to be drawn into the inside 21a of the housing 21 through the grid clearances 38.

The ride plate 40 is formed into a substantially rectangular shape to correspond to the opening 15 in a bottom surface 11d of the hull bottom 11c. The ride plate 40 is provided with the lock tab 42 at the front edge 40a thereof. Bolt holes 45 are formed in a right and left end portion 43, 44 of the ride plate 40. Furthermore, the ride plate 40 is provided with a step portion 46 that forms part of the general bottom surface 11d when it is flush with the general bottom surface (bottom surface) 11d. The ride plate 40 is further provided with a higher level surface 47 that forms a flat surface having a level higher than the step portion 46 by a predetermined distance H. A pair of vent holes 48 that pass vertically through the higher level surface 47 is provided at a position therein close to the step portion 46.

The ride plate 40 can be secured to the opening 15 when the lock tab 42 thereof is placed on the rear end portion 33 of the grid member 31. Bolts 41 are inserted into the bolt holes 45 formed in the ride plate 40. The inserted bolts 41 are screwed into the threaded holes 16a.

A lip 29 (indicated by an imaginary line) is a member disposed in the inside 21a of the housing 21.

Referring back to FIG. 2, when the ride plate 40 is secured rearward of the grid member 31, the step portion 46 is flush with the general bottom surface 11d of the stern 11b. This allows the higher level surface 47 to be disposed at a level higher than the general bottom surface 11d by the predetermined distance H. This makes the vent holes 48 face a bottom portion 20a of the jet propeller 20 housed in the jet propeller chamber 19.

FIG. 4 is a bottom plan view illustrating the jet propeller according to the present invention. FIG. 4 illustrates a condition, in which the grid member 31 is secured to the intake port 12 using bolts 34 with the protrusion 35 thereof inserted into the engagement hole 13a. The ride plate 40 is mounted to the opening 15 using bolts 41 with the lock tab 42 thereof placed on the rear end portion 33 of the grid member 31.

In this condition, the step portion 46 is flush with the general bottom surface 11d of the hull bottom and the higher level surface 47 forms a flat surface higher than the general bottom surface 11d by the predetermined distance H (shown in FIG. 3).

In addition, a pair of vent holes 48, 48 that pass vertically through the higher level surface 47 is provided at a position therein closer to the step portion 46.

The step portion 46 is formed so as to extend across a width direction of the hull 11. Thereby, an overall width W1 of a front end portion 46a is set to be the same as the width of the rear end portion 33 of the grid member 31. Furthermore, the width of a rear end portion 46b in the rear of the front end portion 46a is set to a width W2 which is smaller than the overall width W1.

Each of the pair of vent holes 48, 48 is formed in the proximity of (at a position close to the step portion 46) a corner portion 46c, 46c of the rear end portion 46b.

The procedures used to assemble the hull bottom guard structure of the jet propulsion watercraft 10 will be explained with reference to FIGS. 5(a) and 5(b) and 6.

Figure 5A:
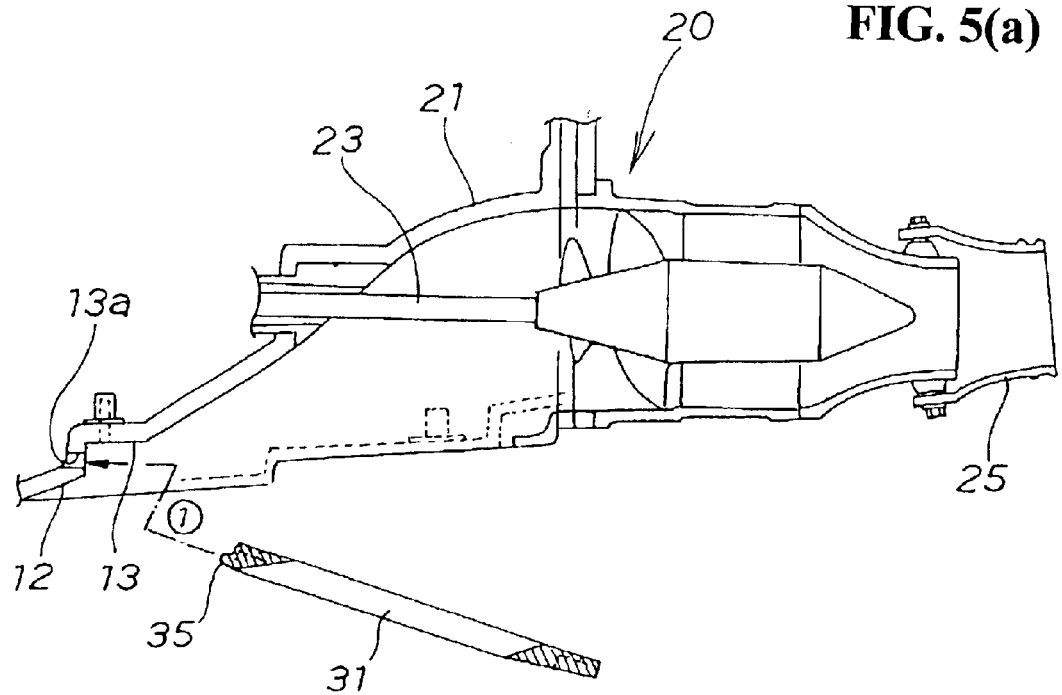
FIGS. 5(a) and 5(b) are explanatory drawings illustrating a first assembly procedure for assembling the hull bottom guard structure of the jet propulsion watercraft according to the present invention.
Figure 5B:
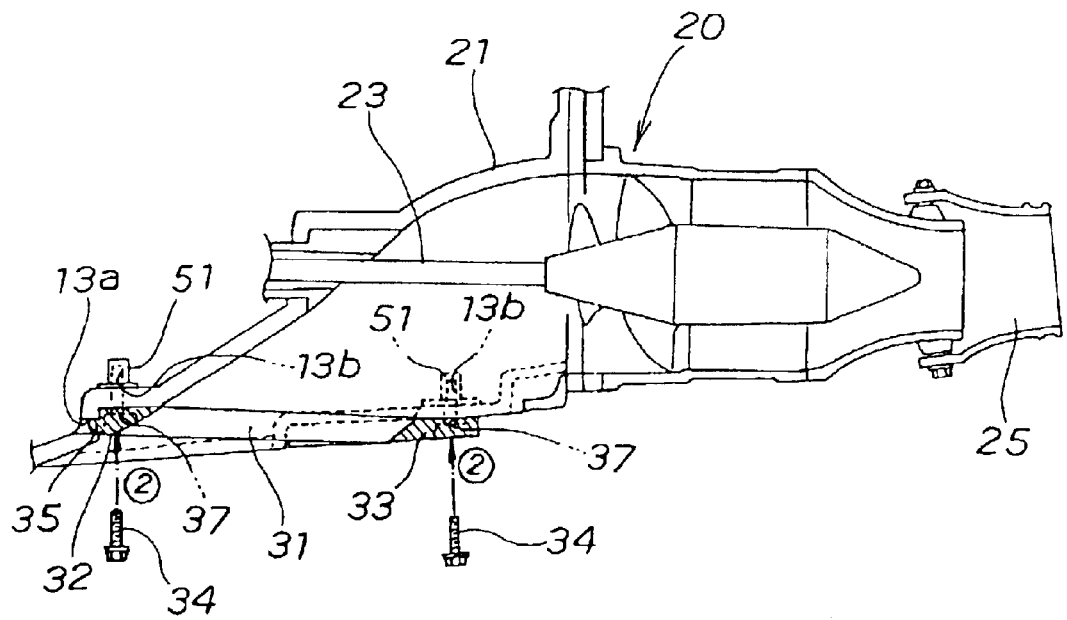

FIGS. 5(a) and 5(b) are explanatory drawings illustrating a first assembly procedure for assembling the hull bottom guard structure of the jet propulsion watercraft according to the present invention.

Referring to FIG. 5(a), the protrusion 35 of the grid member 31 is inserted into the engagement hole 13a in the front recessed portion 13 on the side of the intake port 12 as shown by the arrow ①.

Referring to FIG. 5(b), the bolts 34 are inserted into the bolt holes 37 in the grid member 31 and the inserted bolts 34 are screwed into the threaded holes 13b, thereby securing the grid member 31 to the intake port 12.

The insertion of the protrusion 35 into the engagement hole 13a helps make the mounting job of the grid member 31 easy.

Figure 6A:
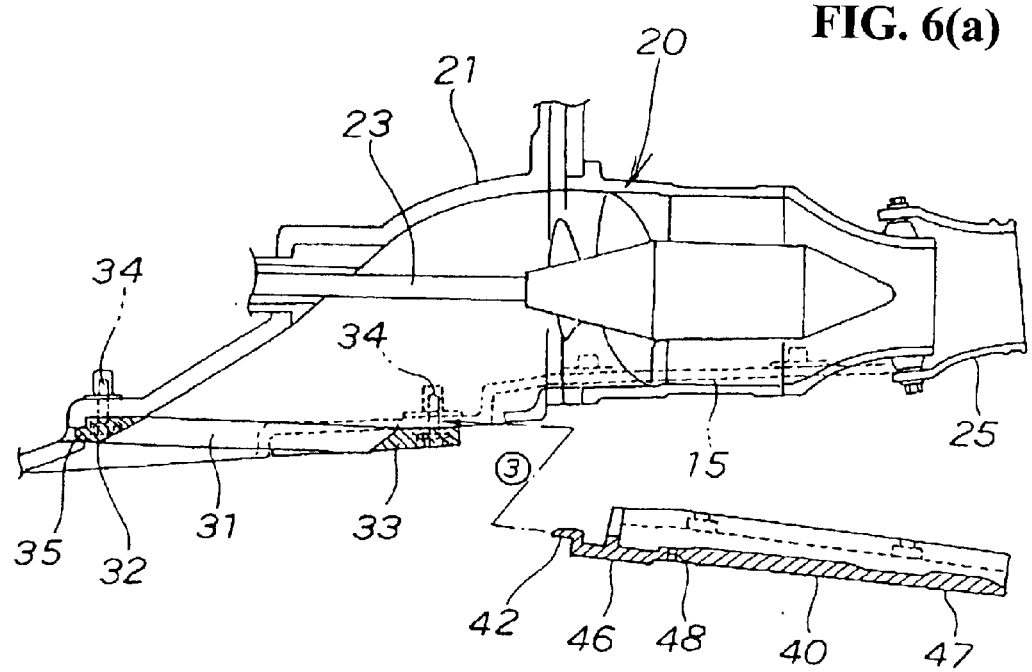
FIGS. 6(a) and 6(b) are explanatory drawings illustrating a second assembly procedure for assembling the hull bottom guard structure of the jet propulsion watercraft according to the present invention.
Figure 6B:
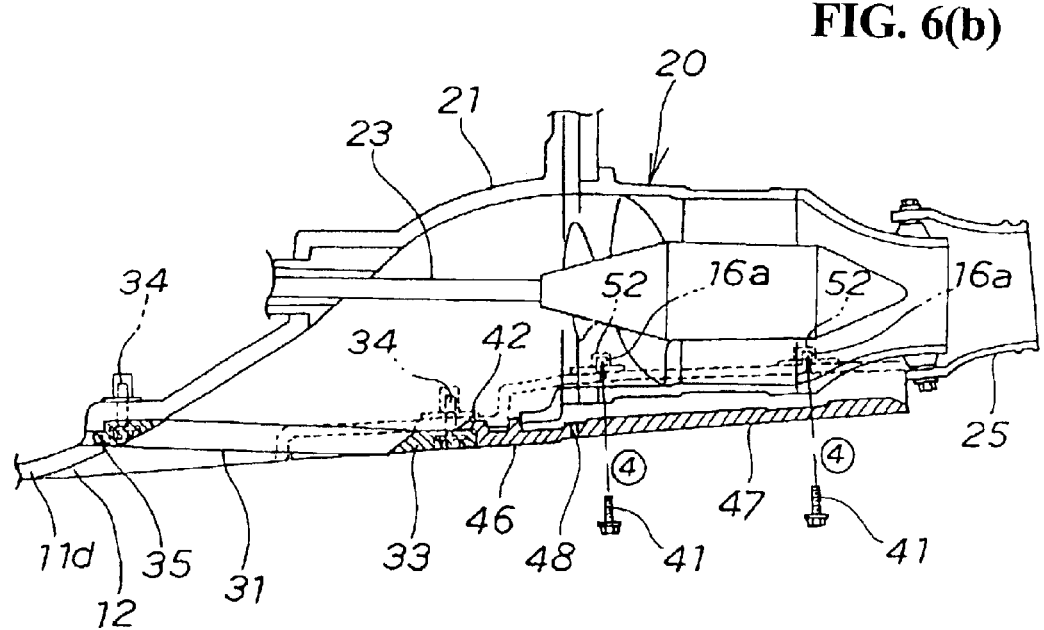

FIGS. 6(a) and 6(b) are explanatory drawings illustrating a second assembly procedure for assembling the hull bottom guard structure of the jet propulsion watercraft according to the present invention.

Referring to FIG. 6(a), the lock tab 42 of the ride plate 40 is placed on the rear end portion 33 of the grid member 31 as shown by the arrow ③.

Referring to FIG. 6(b), the bolts 41 are inserted into the bolt holes 45 (shown in FIG. 3) of the ride plate 40 as shown by the arrow 4 and the inserted bolts 41 are screwed into the threaded holes 16a, thereby the ride plate 40 is secured to the opening 15 (shown in FIG. 6 (a)) in the rear of the intake port 12.

The placement of the lock tab 42 on the rear end portion 33 of the grid member 31 helps make the mounting job of the ride plate 40 easy.

The step portion 46, the higher level surface 47, and the vent holes 48, 48 are formed together on the ride plate 40. Accordingly, it is possible to provide the bottom surface 11d of the stern 11b with a desired step portion 46, higher level surface 47, and vent holes 48, 48 even without stringently controlling the assembly accuracy of the ride plate 40 more than necessary when the ride plate 40 is mounted to the hull 11 (in the rear of the intake port 12).

It is possible to easily provide the step portion 46, the higher level surface 47, and the vent holes 48, 48 required for allowing the jet propulsion watercraft 10 to plane favorably in the manner without having to consume an extra amount of labor.

Figure 7:
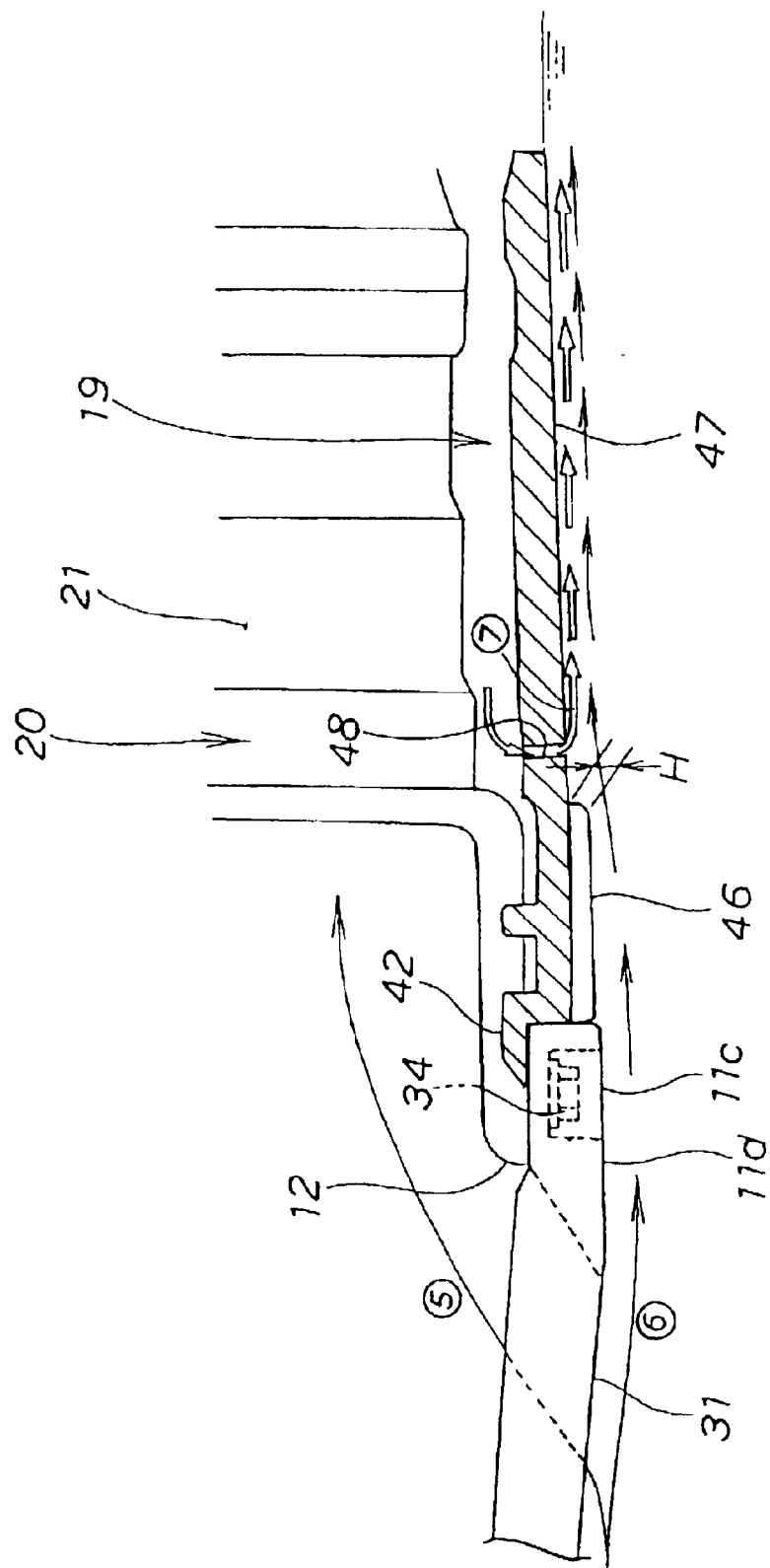
FIG. 7 is an explanatory drawing illustrating the operation of the jet propulsion watercraft according to the present invention.

The operation of the jet propulsion watercraft 10 will be explained with reference to FIG. 7. FIG. 7 is an explanatory drawing illustrating the operation of the jet propulsion watercraft according to the present invention.

During planing of the jet propulsion watercraft, water is drawn into the housing 21 from the bottom surface 11d of the hull bottom 11c through the intake port 12 as indicated by the arrow ⑤. At the same time, water flows rearward as indicated by the arrow ⑥ along the step portion 46 of the ride plate 40.

The higher level surface 47 of the step portion 46 is located at a level higher than the step portion 46 by the predetermined distance H. Accordingly, a difference H is produced at a boundary between the step portion 46 and the higher level surface 47. As a result, pressure in the rear of the step portion 46 is decreased when water flows rearward along the step portion 46 of the ride plate 40 as indicated by the arrow ⑥.

To prevent the pressure in the rear of the step portion 46 from being decreased, air in the jet propeller chamber 19 is supplied through the vent holes 48 at the rear of the step portion 46 to the rear of the step portion 46 as indicated by the arrow ⑦. The air supplied to the rear of the step portion 46 flows rearward as indicated by the arrow ⑦. This effectively prevents the pressure in the rear of the step portion 46 from being decreased, thus maintaining a smooth flow of water.

The purpose of providing the higher level surface 47 at the rear of the step portion 46 is to reduce, during planing of the watercraft, not only the wet surface area of the watercraft, but also the propulsion resistance applied to the watercraft. For this reason, it is important for the jet propulsion watercraft 10 to be configured such that the step portion 46, the higher level surface 47, and the vent holes 48, 48 are easily provided therewith.

It is to be noted that, according to the preferred embodiment explained in the above, there are two vent holes 48, 48 provided in the higher level surface 47. The number of the vent holes 48, 48 may be arbitrarily set.

It is also possible to determine, in proportion to the hull of the watercraft, the difference between the step portion 46 and the higher level surface 47, i.e., the predetermined distance H.

Furthermore, the size and shape of the step portion 46 are not limited to those described in the foregoing discussion. Rather, they may be arbitrarily determined.

The invention according to the present invention as described above offers the following effects.

According to the first aspect of the present invention, the step portion, the higher level portion, and the vent holes are formed together on the ride plate. Accordingly, it is possible to provide the bottom surface of the stern with a desired step portion, higher level surface, and vent holes even without stringently controlling the mounting accuracy of the ride plate more than necessary when the ride plate is mounted to the hull.

It is possible to easily provide a step portion, a higher level surface, and a vent hole required for allowing the jet propulsion watercraft to plane favorably in this manner without having to consume an extra amount of labor. This helps to curtail the cost in making jet propulsion watercrafts.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A jet propulsion watercraft, comprising:
   a hull, said hull including a stern, said stern including a bottom surface having a step portion extending in a width direction of the watercraft to form a higher level surface, said higher level surface being at a level higher than said bottom surface and said lower level surface by a predetermined dimension in a direction toward said watercraft;
   at least one vent hole, said at least one vent hole passing vertically through said higher level surface at a position thereof close to said step portion; and
   a water jet propeller, said water jet propeller being disposed in said stern for expelling a water jet to propel said watercraft, a lower part of said water jet propeller is formed by a ride plate that is removable from said hull, said ride plate being provided with said step portion, said higher level surface, and said at least one vent hole, and said higher level surface and said lower level surface together form a bottom surface of said ride plate.

2. The jet propulsion watercraft according to claim 1, wherein said water jet propeller includes an intake port, said intake port including a grid member removably mounted to said stern for covering an opening of said intake port.

3. The jet propulsion watercraft according to claim 2, wherein said grid member includes front and a rear end portions fitted in recessed portions provided at a front and a rear of said intake port, the front and rear end portions being secured to said intake port with bolts.

4. The jet propulsion watercraft according to claim 3, wherein a protrusion is formed at a front edge of said grid member, said protrusion being fitted into an engagement hole formed in the front recessed portion.

5. The jet propulsion watercraft according to claim 2, wherein said ride plate is secured to a rear end portion of said grid member, said ride plate including a lock tab provided at a front edge thereof, said lock tab being receivable on the rear end portion of said grid member.

6. The jet propulsion watercraft according to claim 2, wherein said step portion includes a first portion and a second portion, said first portion having a width the same as a width of said grid member, and said second portion having a width smaller than the width of said first portion.

7. The jet propulsion watercraft according to claim 1, wherein said ride plate includes a plurality of bolt holes located at opposite side edges of said ride plate, said at least one vent hole being spaced inwardly from said plurality of bolt holes.

8. The jet propulsion watercraft according to claim 1, wherein there are two of said at least one vent holes and said step portion extends from a first of said vent holes to a second of said vent holes.

9. The jet propulsion watercraft according to claim 1, wherein said step portion extends in the width direction of the watercraft more than in longitudinal direction of said watercraft.

10. The jet propulsion watercraft according to claim 1, wherein said step portion extends in the width direction of the watercraft from side edge to a second side edge of said ride plate.

11. A jet propulsion watercraft, comprising:
    a stern, said stern including a bottom surface;
    a water jet propeller, said water jet propeller being disposed in said stern for expelling a water jet to propel said watercraft;
    a ride plate, said ride plate being removably mounted to said stern through a plurality of bolts extending through bolt holes formed in said ride plate, said ride plate being provided with a step portion and a higher level surface, said step portion extending in a width direction of the watercraft and including a lower level surface and a surface extending from said lower level surface to said higher level surface, said higher level surface being at a level higher than said bottom surface of said stern and said lower level surface by a predetermined dimension in a direction toward said watercraft, and said higher level surface and said lower level surface together form a bottom surface of said ride plate; and
    at least one vent hole, said at least one vent hole passing vertically through said higher level surface of said ride plate at a position thereof close to said step portion.

12. The jet propulsion watercraft according to claim 11, wherein said water jet propellers includes an intake port, said intake port including a grid member removably mounted to said stern for covering an opening of said intake port.

13. The jet propulsion water craft according to claim 12, wherein said grid member includes front and a rear end portions fitted in recessed portions provided at a front and a rear of said intake port with bolts.

14. The jet propulsion watercraft according to claim 13, wherein a protrusion is formed at a front edge of said grid member, said protrusion being fitted into an engagement hole formed in the front recessed portion.

15. The jet propulsion watercraft according to claim 12, wherein said ride plate is secured to a rear end portion of said grid member, said ride plate including a lock tab provided at a front edge thereof, said lock tab being receivable on the rear end portion of said grid member.

16. The jet propulsion watercraft according to claim 12, wherein said step portion includes a first portion and a second portion, said first portion having a width the same as a width of said grid member, and said second portion having a width smaller than the width of said first portion.

17. The jet propulsion watercraft according to claim 11, wherein said at least one vent hole opens into a space formed between an upper surface of said ride plate and a bottom portion of said water jet propeller.

18. The jet propulsion watercraft according to claim 11, wherein said plurality of bolt holes are located at opposite side edges of said ride plate, said at least one vent hole being spaced inwardly from said plurality of bolt holes.

19. The jet propulsion watercraft according to claim 11, wherein there are two of said at least one vent holes and said step portion extends from a first of said vent holes to a second of said vent holes.

20. The jet propulsion watercraft according to claim 11, wherein said step portion extends in the width direction of the watercraft more than in the longitudinal direction of said watercraft.

21. The jet propulsion watercraft according to claim 11, wherein said step portion extends in the width direction of the watercraft from a first side edge to a second side edge of said ride plate.

22. A ride plate assembly for a jet propulsion watercraft, the jet propulsion watercraft including a stern having a bottom surface and a water jet propeller, said ride plate assembly comprising:

a ride plate, said ride plate for forming a lower part of said water jet propeller, said ride plate being removably mountable to the stern through a plurality of bolts extending through bolt holes formed in said ride plate, said ride plate being provided with a step portion and a higher level surface, said step portion extending in a width direction of the watercraft and including a lower level surface and a surface extending from said lower level surface to said higher level surface, said higher level surface being at a level higher than the bottom surface of the stern and said lower level surface by a predetermined dimension in a direction toward said watercraft when the ride plate is mounted to the stern, and said higher level surface and said lower level surface together form a bottom surface of said ride plate; and at least one vent hole, said at least one vent hole passing vertically through said higher level surface of said ride plate at a position thereof close to said step portion.

23. The ride plate assembly according to claim 22, wherein the water jet propeller includes an intake port, said ride plate assembly further comprising a grid member removably mountable to the stern for covering an opening of the intake port.

24. The ride plate assembly according to claim 23, wherein said grid member includes front and a rear end portions mountable in recessed portions provided at a front and a rear of the intake port, the front and rear end portions being mountable to the intake port with bolts.

25. The ride plate assembly according to claim 23, wherein a protrusion is formed at a front edge of said grid member, said protrusion being receivable into an engagement hole formed in the front recessed portion.

26. The ride plate assembly according to claim 23, wherein said ride plate is secured to a rear end portion of said grid member, said ride plate including a lock tab provided at a front edge thereof, said lock tab being receivable on the rear end portion of said grid member.

27. The ride plate assembly according to claim 23, wherein said step portion includes a first portion and a second portion, said first portion having a width the same as a width of said grid member, and said second portion having a width smaller than the width of said first portion.

28. The ride plate assembly according to claim 22, wherein said plurality of bolt holes are located at opposite side edges of said ride plate, said at least one vent hole being spaced inwardly from said plurality of bolt holes.

29. The ride plate assembly according to claim 22, wherein there are two of said at least one vent holes and said step portion extends from a first of said vent holes to a second of said vent holes.

30. The ride plate assembly according to claim 22, wherein said step portion extends in the width direction of the watercraft more than in the longitudinal direction of said watercraft.

31. The jet propulsion watercraft according to claim 22, wherein said step portion extends in the width direction of the watercraft from a first side edge to a second side edge of said ride plate.

* * * * *